United States Patent
Goh et al.

(10) Patent No.: US 11,748,998 B1
(45) Date of Patent: Sep. 5, 2023

(54) THREE-DIMENSIONAL OBJECT ESTIMATION USING TWO-DIMENSIONAL ANNOTATIONS

(71) Applicants: Hanlin Goh, Sunnyvale, CA (US); Nitish Srivastava, San Francisco, CA (US); Yichuan Tang, Santa Clara, CA (US); Ruslan Salakhutdinov, Pittsburgh, PA (US)

(72) Inventors: Hanlin Goh, Sunnyvale, CA (US); Nitish Srivastava, San Francisco, CA (US); Yichuan Tang, Santa Clara, CA (US); Ruslan Salakhutdinov, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/824,202

(22) Filed: May 25, 2022

Related U.S. Application Data (63) Continuation of application No. 16/433,213, filed on Jun. 6, 2019, now Pat. No. 11,373,411.
(Continued)

(51) Int. Cl.
*G06V 20/58* (2022.01)
*G06N 20/00* (2019.01)
(Continued)

(52) U.S. Cl.
CPC .............. *G06V 20/58* (2022.01); *B60W 40/04* (2013.01); *G06N 20/00* (2019.01); *G06T 7/337* (2017.01); *G06T 15/205* (2013.01); *G06V 10/757* (2022.01)

(58) Field of Classification Search
CPC .. G06K 9/00805; G06K 9/6211; G06T 7/337; G06T 15/205; G06N 20/00; G06N 3/08; B60W 40/04; G06V 10/25; G06V 10/757; G06V 10/774; G06V 10/82; G06V 20/58; G06V 20/647
See application file for complete search history.

(56) References Cited

U.S. PATENT DOCUMENTS

| 2015/0344028 A1 | 12/2015 | Gieseke et al. |
| 2016/0221592 A1 | 8/2016 | Puttagunta et al. |

(Continued)

FOREIGN PATENT DOCUMENTS

CN 106803071 A 6/2017

*Primary Examiner* — Ruiping Li
(74) *Attorney, Agent, or Firm* — Young Basile Hanlon & MacFarlane, P.C.

(57) ABSTRACT

A method includes obtaining a two-dimensional image, obtaining a two-dimensional image annotation that indicates presence of an object in the two-dimensional image, obtaining three-dimensional sensor information, generating a top-down representation of the three-dimensional sensor information, and obtaining a top-down annotation that indicates presence of the object in the top-down representation. The method also includes determining a bottom surface of a three-dimensional cuboid based on map information, determining a position, a length, a width, and a yaw rotation of the three-dimensional cuboid based on the top-down annotation, and determining a height of the three-dimensional cuboid based on a two-dimensional image annotation, and the position, the length, the width, and the yaw rotation of the three-dimensional cuboid.

21 Claims, 6 Drawing Sheets

Related U.S. Application Data

(60) Provisional application No. 62/738,397, filed on Sep. 28, 2018, provisional application No. 62/684,248, filed on Jun. 13, 2018.

(51) Int. Cl.
*G06T 7/33* (2017.01)
*B60W 40/04* (2006.01)
*G06V 10/75* (2022.01)
*G06T 15/20* (2011.01)

(56) References Cited

U.S. PATENT DOCUMENTS

| | | |
|---|---|---|
| 2017/0220876 A1 | 8/2017 | Gao et al. |
| 2018/0137642 A1 | 5/2018 | Malisiewicz et al. |
| 2018/0144496 A1 | 5/2018 | Posner et al. |
| 2018/0293445 A1 | 10/2018 | Gao et al. |
| 2019/0147600 A1 | 5/2019 | Karasev et al. |
| 2019/0291723 A1* | 9/2019 | Srivatsa .................. G06T 7/521 |
| 2019/0317519 A1* | 10/2019 | Chen ....................... G06T 7/344 |
| 2019/0370606 A1* | 12/2019 | Kehl ....................... G06V 10/82 |
| 2020/0174493 A1 | 6/2020 | Lin et al. |

\* cited by examiner

THREE-DIMENSIONAL OBJECT ESTIMATION USING TWO-DIMENSIONAL ANNOTATIONS

CROSS-REFERENCE TO RELATED APPLICATIONS

This application is a continuation of U.S. application Ser. No. 16/433,213 filed Jun. 6, 2019, which claims the benefit of U.S. Provisional Application No. 62/684,248 filed on Jun. 13, 2018, and also claims the benefit of U.S. Provisional Application No. 62/738,397, filed on Sep. 28, 2018. The contents of the foregoing applications are incorporated herein by reference in their entireties for all purposes.

TECHNICAL FIELD

This disclosure relates to systems and methods for three-dimensional object estimation.

BACKGROUND

Some automated control systems for vehicles detect objects using inputs from sensors. Identifying features from the sensor inputs is a complex process and is often performed using machine learning techniques. Some supervised machine learning techniques use samples that indicate the output expected for a given input. These samples may be referred to as ground truth information. For many types of applications, preparing ground truth information is a time-consuming manual process.

SUMMARY

One aspect of the disclosure is a method that includes obtaining a two-dimensional image, obtaining a two-dimensional image annotation that indicates presence of an object in the two-dimensional image, determining a location proposal based on the two-dimensional image annotation, determining a classification for the object, determining an estimated size for the object based on the classification for the object, and defining a three-dimensional cuboid for the object based on the location proposal and the estimated size.

In some implementations of the method, the two-dimensional image annotation includes a bounding box that describes a location of the object with respect to the two-dimensional image and a size of the object with respect to the two-dimensional image. The two-dimensional image annotation may be determined by an automated annotation process. The automated annotation process may include a trained machine learning model.

In some implementations of the method, the classification for the object is determined by an automated classification process. The automated classification process may include a trained machine learning model.

In some implementations of the method, the location proposal includes a first lateral position coordinate and a second lateral position coordinate that are estimated based on the two-dimensional image annotation and the estimated size for the object. The location proposal may include an elevational position coordinate that is determined based on the first lateral position coordinate, the second lateral position coordinate, and map information. The location proposal may include a rotational orientation that is determined based on a travel lane orientation from the map information at a location that corresponds to the first lateral position coordinate and the second lateral position coordinate.

In some implementations, the method includes defining a two-dimensional projection of the three-dimensional cuboid relative to the two-dimensional image and calculating a probability representing accuracy of the three-dimensional cuboid based on a location of the two-dimensional projection with respect to the two-dimensional image relative to a location of the two-dimensional image annotation with respect to the two-dimensional image.

Another aspect of the disclosure is a non-transitory computer-readable storage device including program instructions executable by one or more processors that, when executed, cause the one or more processors to perform operations. The operations include obtaining a two-dimensional image, obtaining a two-dimensional image annotation that indicates presence of an object in the two-dimensional image, determining a location proposal based on the two-dimensional image annotation, determining a classification for the object, determining an estimated size for the object based on the classification for the object, and defining a three-dimensional cuboid for the object based on the location proposal and the estimated size.

Another aspect of the disclosure is a system that include a memory and a processor that is configured to execute instructions stored in the memory to obtain a two-dimensional image, obtain a two-dimensional image annotation that indicates presence of an object in the two-dimensional image, determine a location proposal based on the two-dimensional image annotation, determine a classification for the object, determine an estimated size for the object based on the classification for the object, and define a three-dimensional cuboid for the object based on the location proposal and the estimated size.

Another aspect of the disclosure is a method that includes obtaining a two-dimensional image, obtaining a two-dimensional image annotation that indicates presence of an object in the two-dimensional image, obtaining three-dimensional sensor information, generating a top-down representation of the three-dimensional sensor information, obtaining a top-down annotation that indicates presence of the object in the top-down representation, determining a bottom surface of a three-dimensional cuboid based on map information, determining a position, a length, a width, and a yaw rotation of the three-dimensional cuboid based on the top-down representation, and determining a height of the three-dimensional cuboid based on the two-dimensional image annotation, and the position, length, width, and yaw rotation of the three-dimensional cuboid.

In some implementations of the method, the three-dimensional sensor information includes a point cloud. Generating the top-down representation of the three-dimensional sensor information may be performed by plotting lateral locations of points from the point cloud in a two-dimensional coordinate space.

The two-dimensional image annotation may be obtained using an automated two-dimensional image annotation process. The top-down annotation is obtained using an automated top-down annotation process.

In some implementations of the method, the height of the three-dimensional cuboid is determined based on a geometric projection of the position, the length, the width, and the yaw rotation of the three-dimensional cuboid relative to the two-dimensional image.

Another aspect of the disclosure is a non-transitory computer-readable storage device including program instructions executable by one or more processors that, when executed, cause the one or more processors to perform operations. The operations include obtaining a two-dimensional image, obtaining a two-dimensional image annotation that indicates presence of an object in the two-dimensional image, obtaining three-dimensional sensor information, generating a top-down representation of the three-dimensional sensor information, obtaining a top-down annotation that indicates presence of the object in the top-down representation, determining a bottom surface of a three-dimensional cuboid based on map information, determining a position, a length, a width, and a yaw rotation of the three-dimensional cuboid based on the top-down representation, and determining a height of the three-dimensional cuboid based on the two-dimensional image annotation, and the position, the length, the width, and the yaw rotation of the three-dimensional cuboid.

Another aspect of the disclosure is a system that includes a memory and a processor configured to execute instructions stored in the memory. The instructions cause the processor to obtain a two-dimensional image, obtain a two-dimensional image annotation that indicates presence of an object in the two-dimensional image, obtain three-dimensional sensor information, generate a top-down representation of the three-dimensional sensor information, obtain a top-down annotation that indicates presence of the object in the top-down representation, determine a bottom surface of a three-dimensional cuboid based on map information, determine a position, a length, a width, and a yaw rotation of the three-dimensional cuboid based on the top-down representation, and determine a height of the three-dimensional cuboid based on the two-dimensional image annotation, and the position, the length, the width, and the yaw rotation of the three-dimensional cuboid.

DETAILED DESCRIPTION

The systems and methods that are described herein generate three-dimensional estimates of the position, orientation, and size of an object that is seen in a two-dimensional image. The three-dimensional estimates may include an estimated position that is expressed in three dimensions, an estimated orientation that is expressed in three dimensions, and an estimated three-dimensional size. As one example, the estimated three-dimensional sizes may be cuboids that have length, width, and height dimensions.

In some implementations, the systems and methods that are described herein are implemented in an off-line system that generates training samples that can be utilized to train a deep neural network. In other implementations, the systems and methods that are described herein may be implemented in a system that estimates three-dimensional position, orientation, and size in real-time, for immediate use by an automated system in a time sensitive application, such as real time control of a mobile autonomous agent (e.g., an autonomous vehicle).

Two-dimensional image annotations of sensors outputs are used for three-dimensional estimation. Two-dimensional sensor outputs include visible spectrum or infrared video images. Two-dimensional sensor outputs may also be referred to as two-dimensional sensor information. Three-dimensional sensor outputs include lidar or structured light point clouds. Three-dimensional sensor outputs may also be referred to as three-dimensional sensor information. Additional information may be used, such as high definition map information (i.e., lane-level mapping of a roadway), vehicle classification information, and vehicle size information.

In some implementations, a single annotated sensor output is used. In other implementations, multiple annotated sensor outputs are used. The two-dimensional image annotations may be generated by manual annotation performed by humans, or by automated annotation performed by machines, for example, by a computing device using a trained machine-learning system.

Figure 1:
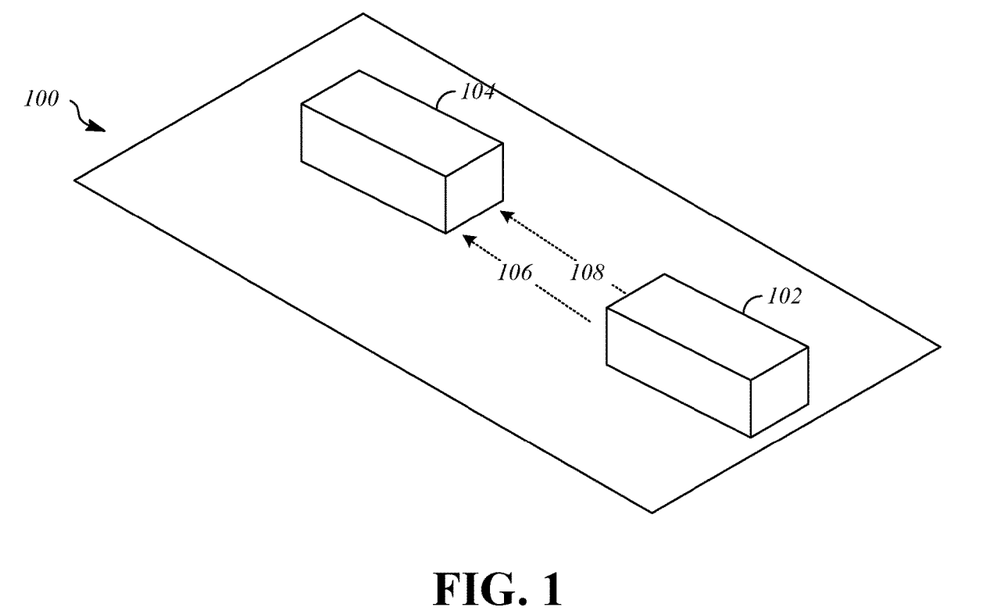
FIG. 1 is an illustration that shows an example of a scenario in which object detection can be used.

FIG. 1 is an illustration that shows an example of a scenario in which object detection can be used, including a path 100 on which a first object 102 is following a second object 104.

The first object 102 includes sensor systems that can obtain information that is usable to determine the presence of the second object 104. This information can be used for real-time sensing applications, such as by an on-board autonomous driving system of the first object 102, or for subsequent processing by a separate system. As will be discussed herein the information obtained by the first object 102 can be used as training examples for a machine learning system, such as a deep neural network (DNN).

The sensor information that is obtained by the first object 102 can include two-dimensional sensor outputs 106 and three-dimensional sensor outputs 108. As an example, the two-dimensional sensor outputs can be images from a still camera or a video camera that obtains visible spectrum images or infrared spectrum images. As an example, the three-dimensional sensor outputs 108 can be three-dimensional point clouds obtained from a lidar sensor, a structured-light-stereo sensor, or any other suitable three-dimensional sensing system. In some examples, path 100 is a road, first object 102 is a first vehicle, and second object 104 is a second vehicle. Although the illustrated example shows object detection applied to the specific task of vehicle detection, it should be understood that the systems and methods that are described herein can be applied to object detection generally. As one example, the systems and methods herein can be applied to detecting, the position, orientation, and size of persons. As another example, the systems and methods herein can be applied to detecting, the position, orientation, and size of objects in the area around a movable electronic device, such as a smart phone or a virtual reality device. The example illustrated by FIG. 1 is a scenario in which information can be obtained that is useful for training machine-learning based object detection systems.

Figure 2:
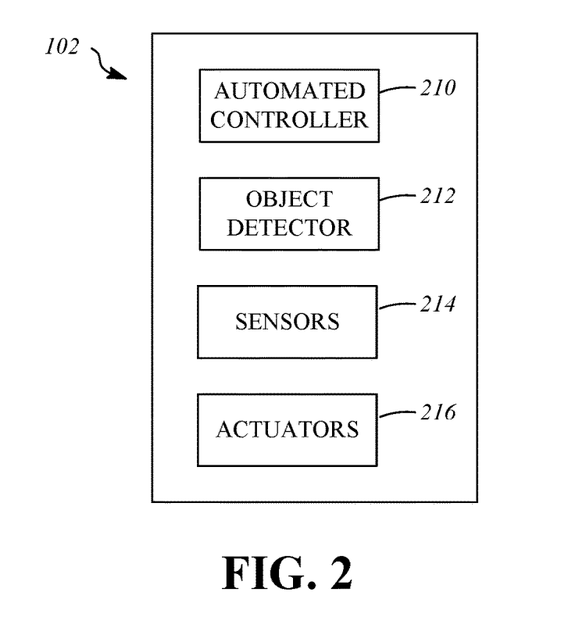
FIG. 2 is a block diagram of a first object.

FIG. 2 is a block diagram of the first object 102. The first object 102 includes an automated controller 210, an object detector 212, sensors 214, and actuators 216.

The automated controller 210 is a system that makes control decisions for the first object 102 based on inputs. The automated controller 210 may be implemented in the form of software that is executed by a computing device including any or all of a circuit, a processor, and a memory device.

The object detector 212 is a system that is able to determine the positions of objects near the first object 102. As an example, the object detector 212 may be implemented using a trained machine learning system, which can be or include a deep neural network (DNN).

The sensors 214 can include cameras, radar sensors, lidar sensors, and other types of sensors. The outputs of the sensors 214 can be used by the object detector 212 for real-time sensing applications and/or can be stored for later use. When stored for later use, sensor outputs from the sensors 214 can be associated with timestamps that indicate the moment in time at which the information was perceived by the sensors 214. The timestamps can be coordinated across different types of sensors in order to allow different types of sensor outputs to be compared and used jointly during subsequent processing.

The actuators 216 are devices that cause and control motion of the first object 102, such as suspension actuators, steering actuators, braking actuators, and propulsion actuators. The automated controller 210 is operable to control motion of the first object 102 by outputting commands to the actuators 216.

Figure 3:
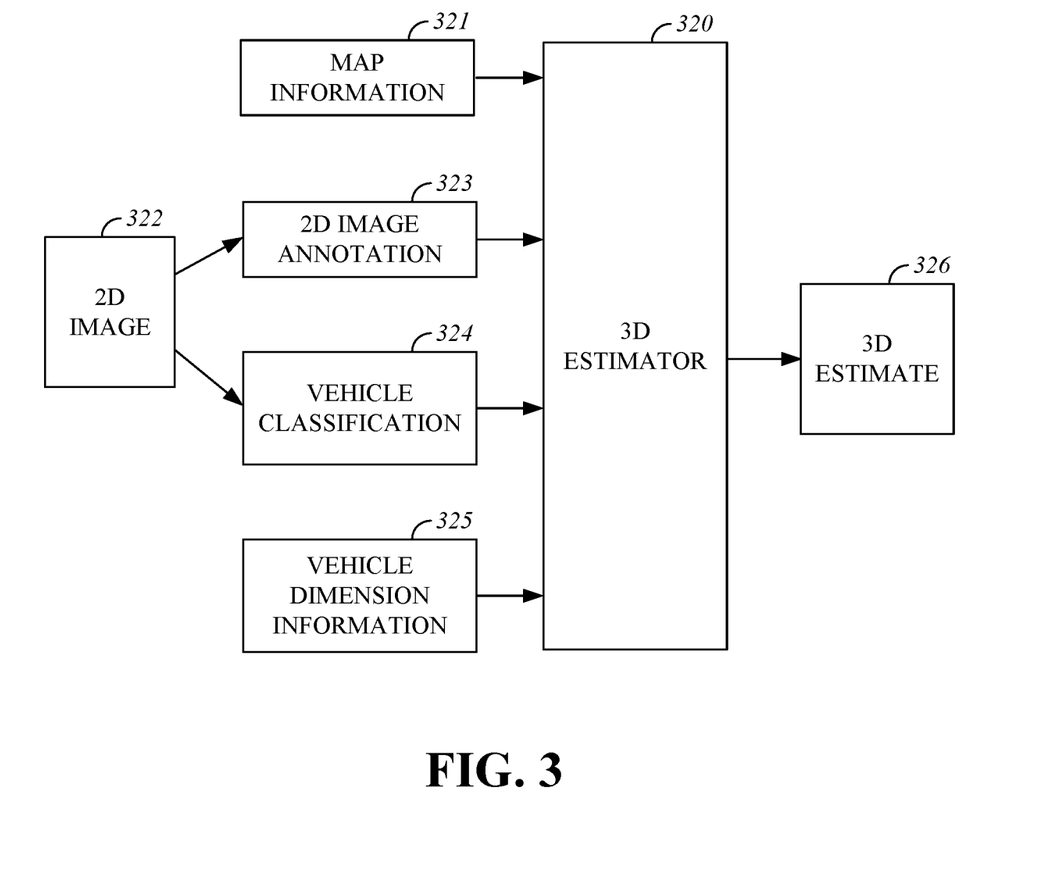
FIG. 3 is a block diagram that shows a three-dimensional estimator according to a first example.

FIG. 3 is a block diagram that shows a three-dimensional estimator 320 according to a first example. As an example, the three-dimensional estimator 320 may be included in the object detector 212 of FIG. 2. The three-dimensional estimator 320 may be used for other purposes, such as for preparing ground truth information to be used in training a machine-learning model that is intended to perform three-dimensional object detection in real time.

As inputs, the three-dimensional estimator 320 receives a map information 321, a two-dimensional image 322 that is used to determine a two-dimensional image annotation 323 and a vehicle classification 324, and vehicle dimension information 325. As an output, the three-dimensional estimator 320 generates a three-dimensional estimate 326.

The map information 321 is obtained from a map based on the location at which the two-dimensional image 322 was obtained. The map information 321 includes information that can be used to determine the elevations of the surface (e.g., road surface) that the object being detected is located on. As an example, the map can be a high-resolution three-dimensional map from which a three-dimensional mesh can be constructed, and surface elevations can be determined using the three-dimensional mesh.

The two-dimensional image 322 may be an image that is defined by pixels that represent visible or infrared light that was sensed by a camera. The two-dimensional image 322 can be in a standard format of any suitable type, such as an image format that can be interpreted to determine values (e.g., RGB values) for pixels.

The two-dimensional image annotation 323 is information that indicates where an object is located in the two-dimensional image 322. The two-dimensional image annotation 323 can be, for example, a bounding box. The bounding box can be described, for example, in terms of minimum and maximum x and y values corresponding to the extents of the bounding box relative to the two-dimensional image 322.

The two-dimensional image annotation 323 can be determined by manual or automated processes. As an example of a manual process, the two-dimensional image annotation 323 can be generated manually by a human annotator that draws a bounding box on the two-dimensional image 322 such that that the object is located entirely inside the bounding box. As an example of an automated process, a machine-learning based process can be used to generate the two-dimensional image annotation 323, such as by using feature recognition techniques. As one example, automated generation of the two-dimensional image annotation 323 can be performed using a trained machine-learning model, such as a trained neural network.

The vehicle classification 324 describes the type of vehicle that corresponds to the object that is indicated by the two-dimensional image annotation 323. The vehicle classification 324 can be a category that is useful to estimate characteristics of the vehicle, such as size. Examples of categories include car, truck, and bus. The vehicle classification 324 can be determined manually, such as by a human that codes metadata describing the vehicle from the two-dimensional image annotation 323 after viewing the two-dimensional image 322. The vehicle classification 324 can be determined automatically, such as by a machine-learning based object classifier, which may be implemented using a trained deep neural network or other machine learning model. In some implementations, the vehicle classification 324 can be a general identifier for a category of vehicles (e.g., car, truck, bus). In some implementations, the vehicle classification 324 can be a specific identifier that described, for example, the make and model of the vehicle that corresponds to the two-dimensional image annotation 323.

The vehicle dimension information 325 is a pre-defined data source that describes average known sizes for each vehicle classification 324. For example, if the vehicle classification is "truck," specific length, width, and height values can be obtained from the vehicle dimension information 325 based on the vehicle classification 324. In implementations in which objects being detected are other than vehicles, the vehicle classification 324 and the vehicle size information 325 may be replaced with generic object classifications and object dimension information to represent the objects being detected.

When the three-dimensional estimator 320 is applied to estimation for objects other than vehicles, the vehicle classification 324 can be a classification that corresponds to a characteristic of the object being detected, and the vehicle dimension information 325 can instead be a predetermined data source that corresponds to the objects being detected.

The three-dimensional estimator 320 uses the location where the two-dimensional image 322 was captured and the orientation of the camera that captured the image to identify the area from the map where objects seen in the image may have been positioned at the time the two-dimensional image was captured. From this area of the map, using the two-dimensional image annotation 323 and geometric principles, the three-dimensional estimator 320 selects multiple locations as location proposals. Each location proposal can be expressed in terms of x, y, and z coordinates of a proposed location for the object.

The location proposals can be selected using geometric techniques. A vertical dimension of the two-dimensional image annotation (e.g., in pixels relative to the image) can be utilized to estimate the distance of the object from the location where the two-dimensional image 422 was captured based on an assumed height of the object (e.g., based on the vehicle classification 324) and according to properties of the camera (e.g., angle of view) and using known geometric construction techniques. A center point of the object can be estimated based on the center point of the two-dimensional image annotation 323 and utilized to determine an angular offset of the center point of the object relative to the optical axis of the camera. These two estimates, together, define an estimate of the position of the object in two-dimensional space in terms of polar coordinates relative to the location where the two-dimensional image 422 was captured and the orientation of the camera that captured the two-dimensional image 422, and this estimate can be used as the x coordinate and the y coordinate of a location proposal (e.g., by conversion x and y locations in world space).

For each two-dimensional location proposal, the elevation of the object (e.g., the z coordinate) can be determined using the map information 321 by selecting the surface elevation from the map based on the x and y coordinates, thereby defining a three-dimensional location proposal. For example, the location corresponding to the two-dimensional image annotation 323 relative to the map can be estimated, and the elevation is determined by intersection of that two-dimensional bounding box (or other annotation) with the surface determined from the map information 321. Multiple location proposals can be generated in the same manner by varying assumptions made in the estimation process, such as by generating location proposals that correspond to high, medium, and low height estimates for the object.

Each location proposal can include position coordinates in three dimensions (e.g., a first lateral position coordinate, a second lateral position coordinate, and an elevational position coordinate), rotations in three dimensions (e.g., yaw, pitch, and roll), and size values in three dimensions (e.g., width, length and height values). These values define a proposed three-dimensional cuboid that represents the location, orientation, and size of the object. For example, each location proposal can be expressed as a vector in the following form: $(x, y, z, \theta x, \theta y, \theta z, w, l, h)$. The size values (e.g., w, l, h) can be determined from the vehicle dimension information 325 based on the vehicle classification 324. The rotation values can be determined in part from the two-dimensional image 322, such as by estimating roll and pitch using feature recognition techniques. The yaw value (i.e., rotational orientation as viewed from above) can be estimated based on the map information 321, by assuming determining the angular orientation of the travel lane that the vehicle is located in and setting the yaw value of the location proposal equal to the angular orientation of the lane at the corresponding location, as determined from the map information 321.

The three-dimensional cuboid that is described by the location, orientation and size from each location proposal is used to construct a projected two-dimensional bounding box relative to the two-dimensional image 322 that is being used as the basis of the estimate. The projected two-dimensional bounding box can be described by minimum and maximum x and y values relative to the two-dimensional image 322 in the manner described for the two-dimensional image annotation 323.

The projected two-dimensional bounding box is compared to the two-dimensional image annotation 323, and a distance value is computed that represents the difference in position of the location of the two-dimensional image annotation 323 relative to the projected two-dimensional bounding box. The distance value is used to determine a probability that the location proposal is correct. Once the probability is determined for each of the location proposals, the three-dimensional estimator 320 determines the three-dimensional estimate 326. As one example, the three-dimensional estimate 326 may be determined by selection of the location proposal having the highest probability as the three-dimensional estimate 326. As another example, two or more of the location proposals can be combined using their probability values and according to known optimization techniques to determine the three-dimensional estimate 326 as a blend of two or more of the location proposals.

Figure 4:
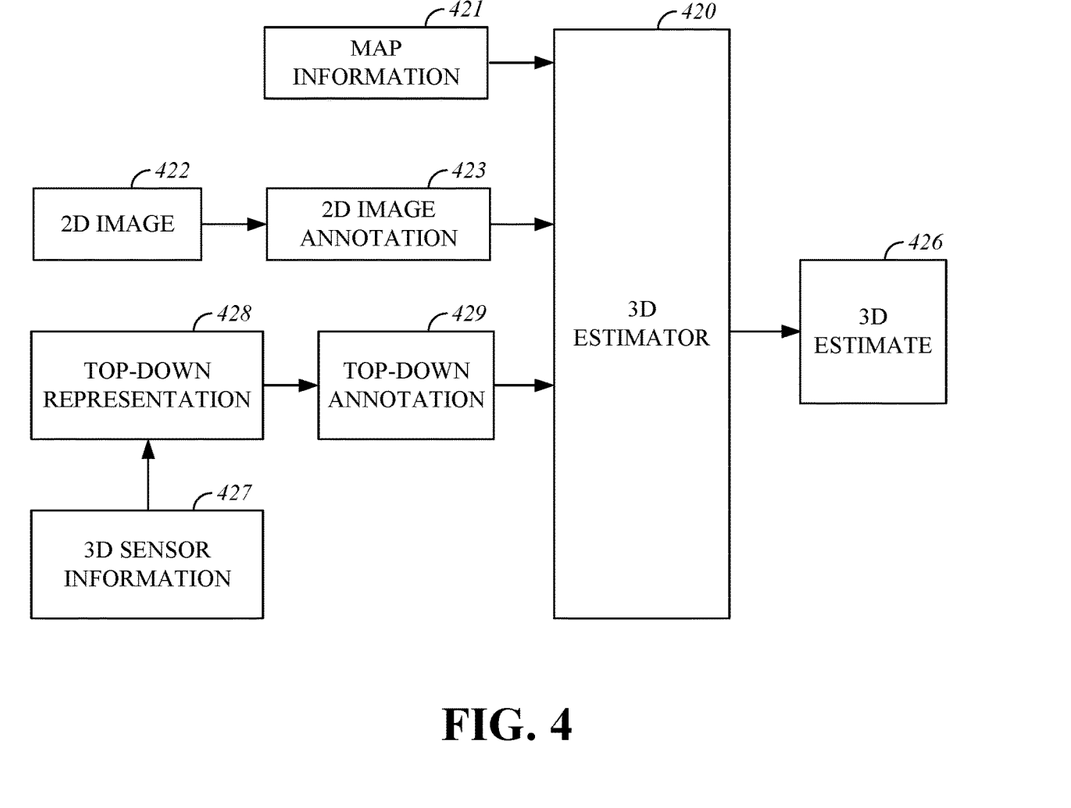
FIG. 4 is a block diagram that shows a three-dimensional estimator according to a second example.

FIG. 4 is a block diagram that shows a three-dimensional estimator 420 according to a second example. As an example, the three-dimensional estimator 420 may be included in the object detector 212 of FIG. 2. The three-dimensional estimator 420 may be used for other purposes, such as for preparing ground truth information to be used in training a machine-learning model that is intended to perform three-dimensional object detection in real time.

As inputs, the three-dimensional estimator 420 receives a map information 421, a two-dimensional image 422 that is used to determine a two-dimensional image annotation 423, and three-dimensional sensor information 427 that is used to determine a top-down representation 428 and a top-down annotation 429.

The map information 421, the two-dimensional image 422, and the two-dimensional image annotation 423 are equivalent to the map information 321, the two-dimensional image 322, and the two-dimensional image annotation 323 utilized with the three-dimensional estimator 320, and the same description applies, except as stated otherwise herein.

The three-dimensional sensor information 427 is information that represents the presence and/or absence of objects as particular locations in three-dimensional space. As an example, the three-dimensional sensor information may be a three-dimensional point cloud output by a lidar detector or another suitable three-dimensional sensing device. As is well-known, the three-dimensional point cloud may include a large number of points, described as coordinates in three-dimensional space, at which the presence of a surface was detected. The three-dimensional point cloud is recorded from the point of view of the sensor that detected it, and thus is subject to line-of-sight constraints, such that surfaces are only indicated by points in the point cloud if they were visible to the sensor.

The top-down representation 428 is a graphical representation of the three-dimensional sensor information from a top-down perspective, which may be referred to as a bird's eye view (BEV). The top-down representation may be defined, output, and/or displayed as a two-dimensional image in first and second lateral dimensions (e.g., x and y coordinates). The top-down representation 428 is created using the three-dimensional sensor information 427, such as by plotting the lateral locations of the points from the point cloud in a two-dimensional coordinate space (e.g., x and y coordinates) without regard to elevation information.

The top-down annotation 429 is an annotation such as a bounding box that is made with respect to the top-down representation 428 of the three-dimensional sensor information 427. The top-down annotation 429 can be determined manually by a human annotator or by an automated system, such as a machine-learning based system, as discussed with respect to the two-dimensional image annotation 323. The top-down annotation 429 represents the position, the length, the width, and the yaw rotation of the same object (e.g., vehicle) that is the subject of the two-dimensional image annotation 423.

The three-dimensional estimator 420 generates the three-dimensional position estimate 426 is a manner that represents the three-dimensional position, orientation, and size of the object that is being detected. In the example described herein, the three-dimensional position estimate 426 is in the form of a cuboid that has a position in three dimensions (e.g., a center point of the cuboid), rotation values in three dimensions, and three-dimensional size values (e.g., length, width, and height). It should be understood that other three-dimensional representations could be generated by the three-dimensional estimator 420 other than cuboids.

The three-dimensional estimator 420 uses the location where the two-dimensional image 422 was captured and the orientation of the camera that captured the two-dimensional image 422 to identify the area from the map where objects seen in the image may have been positioned at the time the two-dimensional image was captured. The surface from the map information 421 is used to define a base elevation for the three-dimensional position estimate 426. In the current example, the map information 421 is used to define an unbounded plane that will define a bottom surface of the cuboid that is defined by the three-dimensional position estimate 426. The elevation of the object (e.g., the z coordinate) is therefore dependent on the map information 421 and the elevation of the road surface, as determined from the map information, at the estimated lateral location of the object.

The three-dimensional estimator 420 uses the top-down annotation 429 to determine the lateral (e.g., x and y coordinate) position, length, width, and yaw rotation of the object. This constrains the location of the base plane determined from the map information 421, which allows the elevation of the object to be determined based on the elevation of the surface from the map.

The height of the three-dimensional position estimate 426 is determined using the two-dimensional image annotation 423 and the top-down annotation 429. The size of the object cannot be determined directly for the two-dimensional image annotation 423 because the size of the two-dimensional image annotation is dependent on the distance of the object from the camera at the time that the image is obtained. The actual length and width of the object are, however, know from the top-down annotation 429. By geometric projection to according to the point of view from which the two-dimensional image 422 was obtained, the top-down annotation 429 is axis-aligned relative to the two-dimensional image annotation, which allows the known size of the top-down annotation to be used to determine the width of the two-dimensional image annotation 423, and the height of the two-dimensional image annotation 423 is then determined by its size relative to the width of the two-dimensional image annotation 423, which give the height value for the three-dimensional position estimate 426, which defines the top surface of the cuboid.

Figure 5:
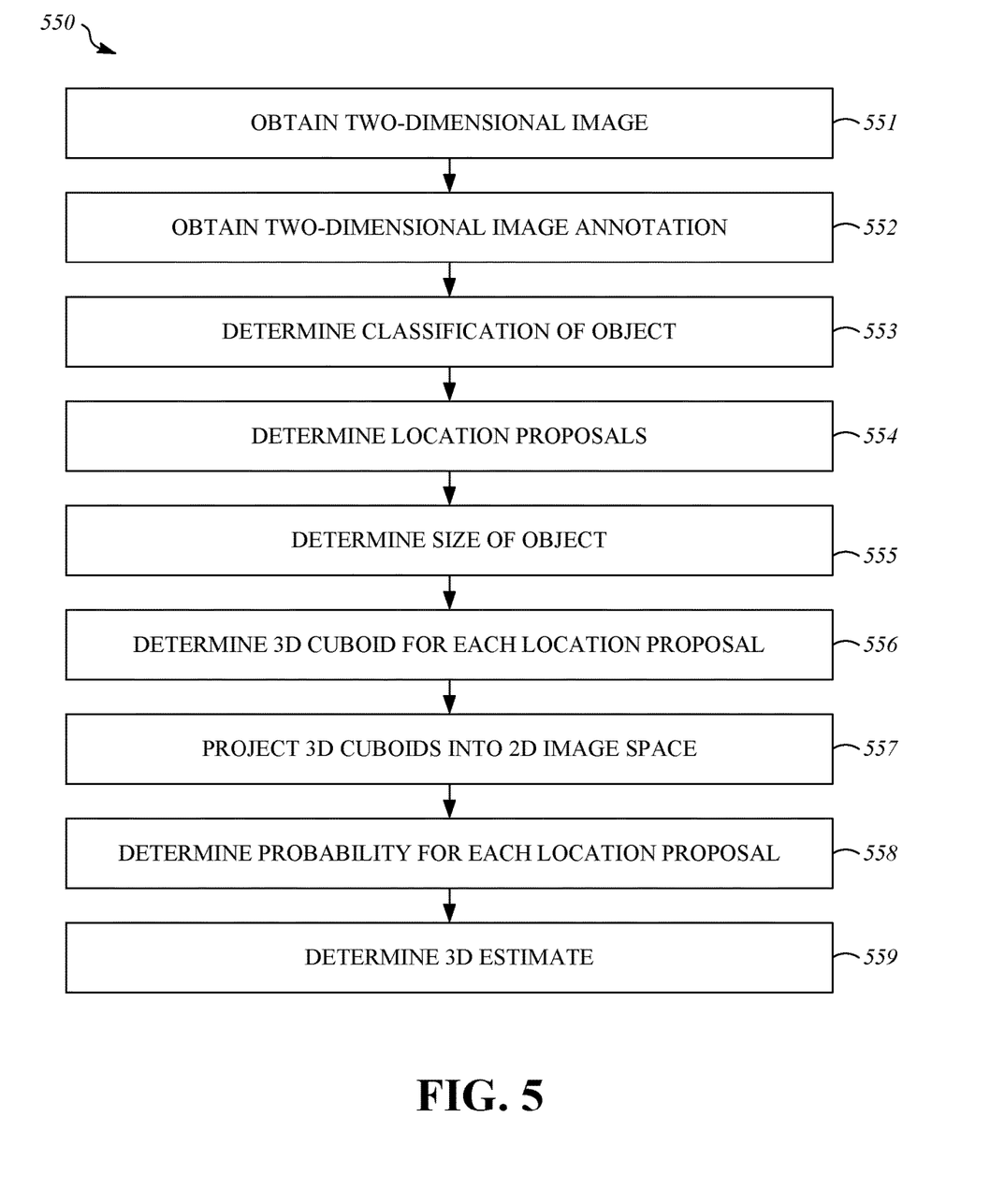
FIG. 5 is a flowchart that shows a first example of a process for three-dimensional object estimation using two-dimensional image annotations.

FIG. 5 is a flowchart that shows an example of a process 550 for three-dimensional object estimation using two-dimensional image annotations. The process 550 implements the object estimation described with respect to the three-dimensional estimator 320. The process 550 can be implemented using a computing device. For example, the process 550 can implemented in the form of program instructions that stored in a non-transitory computer-readable storage device. The program instructions are executable by one or more processors to perform the operations described herein with respect to the process 550. The program instructions may be stored in a memory device (e.g., by transferring them from the non-transitory computer-readable storage device to a random-access memory device or other memory device) and the processor may access the instructions from the memory device to execute the program instructions. The instructions cause performance of the process 550 by the computing device. Alternatively, the process 550 can be implemented directly in hardware, firmware, or software, circuitry, or a combination thereof.

Operation 551 includes obtaining a two-dimensional image. As one example, obtaining the two-dimensional image may be performed by accessing the two-dimensional image from a storage device. As another example, obtaining the two-dimensional image may be performed by receiving the two-dimensional image in a transmission over a wired or wireless network. As another example, obtaining the two-dimensional image may be performed by receiving that two-dimensional image as an output from a camera.

Operation 552 includes obtaining a two-dimensional image annotation that indicates presence of an object in the two-dimensional image. In some implementations of the method, the two-dimensional image annotation includes a bounding box that describes a location of the object with respect to the two-dimensional image and a size of the object with respect to the two-dimensional image.

The two-dimensional image annotation may be determined by an automated annotation process. One example of an automated annotation process utilizes a trained machine-learning model to identify objects in the image, determine the spatial extents of the objects, and output bounding boxes (e.g., minimum and maximum x and y coordinate values that can be used to define a rectangle). Alternatively, the two-dimensional image annotation may be determined by a manual process. A human annotator can define information that describes the location of the object with respect to the two-dimensional image, such as by drawing a bounding box on the image according to the spatial extents of the object within the image.

Operation 553 includes determining a classification for the object. In implementations in which the objects being detected are vehicles, the classification that is determined in operation 553 may be the vehicle classification 324. In some implementations of the method, the classification for the object is determined by an automated classification process. One example of an automated classification includes a trained machine learning model that is configured to identify the object in the image and identify one of multiple predetermined classifications that it should be assigned to. Alternatively, the classification may be determined by a manual classification process in which a human annotator decides which classification should be assigned to the object.

Operation 554 includes determining one or more location proposals. The location proposal may be determined based on the two-dimensional image that was obtained in operation 551, the two-dimensional image annotation that was obtained in operation 552, and map information. The location proposals may each include positions and rotations. The positions may be determined in three dimensions (e.g., x, y, and z coordinates) and the rotations may be determined in three dimensions (e.g., yaw, pitch, and roll).

The location proposal may include a first lateral position coordinate and a second lateral position coordinate that are estimated based on the two-dimensional image annotation and the estimated size for the object. The location proposal may include an elevational position coordinate that is determined based on the first lateral position coordinate, the second lateral position coordinate, and map information. The location proposal may include a rotational orientation that is determined based on a travel lane orientation from the map information at a location that corresponds to the first lateral position coordinate and the second lateral position coordinate.

In operation 555, the size of the object is determined. The size of the object may be estimated based on a classification for the object that was determined in operation 553. In some implementations, a pre-defined size estimate is associated with each of multiple classifications, allowing the size of the object to be estimated according to the classification.

In operation 556, a three-dimensional cuboid is determined for each location proposal. As an example, the three-dimensional cuboid for the object may be determined based on the location proposal from operation 554 and the size of the object that was determined in operation 555.

In operation 557, the three-dimensional cuboids are projected into two-dimensional space relative to the image. Operation 557 can be performed according to known geometric techniques as previously described.

In operation 558, a probability is determined for each location proposal based on a difference between the projected bounding box and the two-dimensional image annotation. The probability that is determined (e.g., by calculating) in operation 558 represents accuracy of the three-dimensional cuboid based on the location of the two-dimensional projection with respect to the two-dimensional image relative to the location of the two-dimensional image annotation with respect to the two-dimensional image.

In operation 559, a three-dimensional estimate is determined based on the location proposals and the probabilities. As one example, the probabilities that were calculated in operation 558 for the location proposals can be compared, and the location proposal that is associated with the highest probability can be utilized as the three-dimensional estimate. As another example, some or all of the location proposals can be combined. For example, the location proposals can be combined as an average or as a weighted average that is weighted according to the probabilities that were determined in operation 558.

Figure 6:
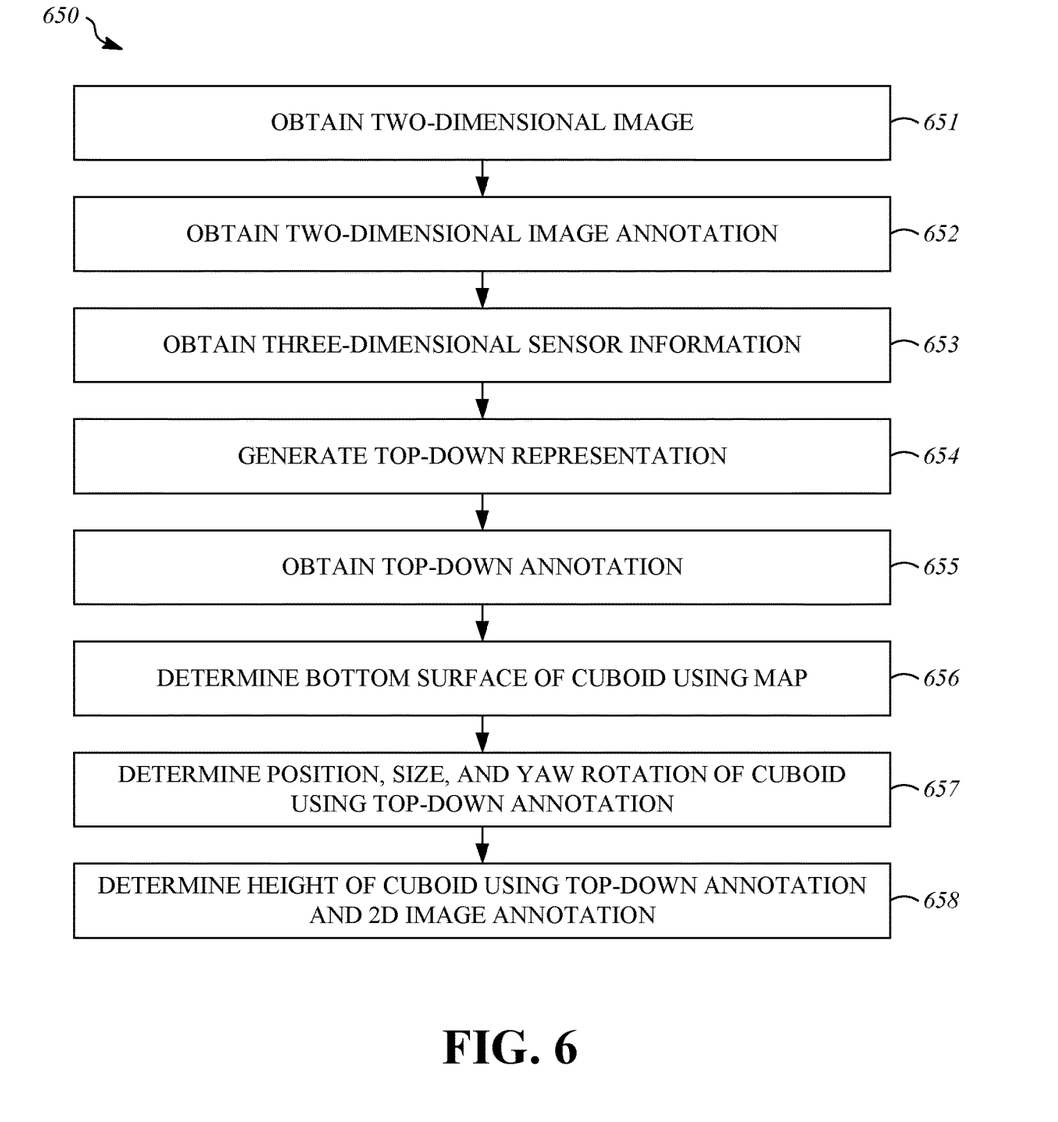
FIG. 6 is a flowchart that shows a second example of a process for three-dimensional object estimation using two-dimensional image annotations.

FIG. 6 is a flowchart that shows an example of a process 650 for three-dimensional object estimation using two-dimensional image annotations. The process 650 implements the object estimation described with respect to the three-dimensional estimator 420. The process 650 can be implemented using a computing device. For example, the process 650 can implemented in the form of program instructions that stored in a non-transitory computer-readable storage device. The program instructions are executable by one or more processors to perform the operations described herein with respect to the process 650. The program instructions may be stored in a memory device (e.g., by transferring them from the non-transitory computer-readable storage device to a random-access memory device or other memory device) and the processor may access the instructions from the memory device to execute the program instructions. The instructions cause performance of the process 650 by the computing device. Alternatively, the process 650 can be implemented directly in hardware, firmware, or software, circuitry, or a combination thereof.

Operation 651 includes obtaining a two-dimensional image. As one example, obtaining the two-dimensional image may be performed by accessing the two-dimensional image from a storage device. As another example, obtaining the two-dimensional image may be performed by receiving the two-dimensional image in a transmission over a wired or wireless network. As another example, obtaining the two-dimensional image may be performed by receiving that two-dimensional image as an output from a camera.

Operation 652 includes obtaining a two-dimensional image annotation that indicates presence of an object in the two-dimensional image. In some implementations of the method, the two-dimensional image annotation includes a bounding box that describes a location of the object with respect to the two-dimensional image and a size of the object with respect to the two-dimensional image.

The two-dimensional image annotation may be determined by an automated annotation process (i.e., an automated two-dimensional image annotation process). One example of an automated annotation process utilizes a trained machine-learning model to identify objects in the image, determine the spatial extents of the objects, and output bounding boxes (e.g., minimum and maximum x and y coordinate values that can be used to define a rectangle). Alternatively, the two-dimensional image annotation may be determined by a manual process. A human annotator can define information that describes the location of the object with respect to the two-dimensional image, such as by drawing a bounding box on the image according to the spatial extents of the object within the image.

Operation 653 includes obtaining three-dimensional sensor information. The three-dimensional sensor information may be, for example, a point cloud that was collected from outputs generator by a three-dimensional sensor such as a lidar sensor.

Operation 654 includes generating a top-down representation. The top-down representation may be generated based on the x and y coordinates from the three-dimensional sensor information obtained in operation 653, by projecting the points in an x-y coordinate space without regard to their respective elevations. Stated differently, generating the top-down representation of the three-dimensional sensor data may be performed by plotting lateral locations of points from the point cloud in a two-dimensional coordinate space.

Operation 655 includes obtaining a top-down annotation that indicates presence of an object in a top-down representation. In some implementations of the method, the top-down annotation is a two-dimensional bounding box that describes the position, rotation, and size (length and width) of the object from a top down perspective, relative to the top-down representation that was obtained in operation 654. The top-down annotation may be obtained by a manual top-down annotation process or by an automated top-down annotation process (e.g., using a trained machine learning model) as previously described with respect to other image annotations.

In operation 656 an unbounded bottom surface of a cuboid is determined using map information. In particular, the surface elevations of the map described by the map information may be used to define the elevation and/or contour of the unbounded bottom surface of the cuboid based on the location at which the two-dimensional image from operation 651 was obtained.

In operation 657, the position, size and yaw rotation of the cuboid are determined using the top-down annotation that was obtained in operation 655. This defines the front, rear, left, and right surfaces of the cuboid.

In operation 658, a height for the cuboid is determined by geometric projection of the top-down annotation relative to the two-dimensional image annotation that was obtained in operation 652. In particular, an accurate representation of the width of the object is known from the position, size, and yaw rotation of the cuboid, as determined in operation 657. The width of the two-dimensional image annotation, in pixels, and the actual width of the object, as projected onto the image (e.g., from the perspective of the camera) can be used to determine the unit length represented by a pixel in the image at the location of the object, and the height of the object can then be determined by applying this as a scaling factor to the pixel-wise height of the object in the two-dimensional image. This defines the top surface for the cuboid, which may be assumed parallel to the bottom surface of the cuboid.

Figure 7:
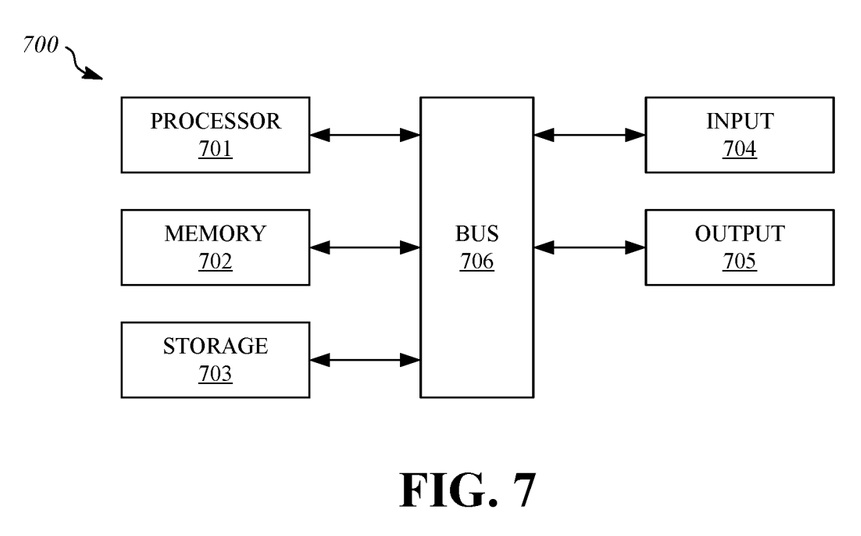
FIG. 7 is an illustration that shows an example of a hardware configuration for a computing device.

FIG. 7 is an illustration that shows an example of a hardware configuration for a computing device that can be used to implement computing devices described herein, including computing devices that may be used to implement the three-dimensional estimator 320 and the three-dimensional estimator 420. The computing device 700 may include a processor 701, a memory 702, a storage device 703, one or more input devices 704, and one or more output devices 705. The computing device 700 may include a bus 706 or a similar device to interconnect the components for communication. The processor 701 is operable to execute computer program instructions and perform operations described by the computer program instructions. As an example, the processor 701 may be a conventional device such as a central processing unit. The memory 702 may be a volatile, high-speed, short-term information storage device such as a random-access memory module. The storage device 703 may be a non-volatile information storage device such as a hard drive or a solid-state drive. The input devices 704 may include any type of human-machine interface such as buttons, switches, a keyboard, a mouse, a touchscreen input device, a gestural input device, or an audio input device. The output devices 705 may include any type of device operable to provide an indication to a user regarding an operating state, such as a display screen or an audio output.

What is claimed is:

1. A non-transitory computer-readable storage device including program instructions executable by one or more processors that, when executed, cause the one or more processors to perform operations, the operations comprising:
    obtaining a two-dimensional image;
    obtaining a two-dimensional image annotation that indicates presence of an object in the two-dimensional image;
    obtaining three-dimensional sensor information;
    generating a top-down representation of the three-dimensional sensor information;
    obtaining a top-down annotation that indicates presence of the object in the top-down representation;
    determining a bottom surface of a three-dimensional cuboid based on map information;
    determining a position, a length, a width, and a yaw rotation of the three-dimensional cuboid based on the top-down annotation; and
    determining a height of the three-dimensional cuboid based on the two-dimensional image annotation, and the position, the length, the width, and the yaw rotation of the three-dimensional cuboid.

2. The non-transitory computer-readable storage device of claim 1, wherein the three-dimensional sensor information includes a point cloud.

3. The non-transitory computer-readable storage device of claim 2, wherein generating the top-down representation of the three-dimensional sensor information is performed by plotting lateral locations of points from the point cloud in a two-dimensional coordinate space.

4. The non-transitory computer-readable storage device of claim 1, wherein the two-dimensional image annotation is obtained using an automated two-dimensional image annotation process.

5. The non-transitory computer-readable storage device of claim 1, wherein the top-down annotation is obtained using an automated top-down annotation process.

6. The non-transitory computer-readable storage device of claim 1, wherein the height of the three-dimensional cuboid is determined based on a geometric projection of the position, the length, the width, and the yaw rotation of the three-dimensional cuboid relative to the two-dimensional image.

7. The non-transitory computer-readable storage device of claim 1, wherein the position of the three-dimensional cuboid includes a lateral location of the object, and the bottom surface of the three-dimensional cuboid is determined further based on the lateral location of the object.

8. A method, comprising:
    obtaining a two-dimensional image;
    obtaining a two-dimensional image annotation that indicates presence of an object in the two-dimensional image;
    obtaining three-dimensional sensor information;
    generating a top-down representation of the three-dimensional sensor information;
    obtaining a top-down annotation that indicates presence of the object in the top-down representation;
    determining a bottom surface of a three-dimensional cuboid based on map information; and
    determining a position, a length, a width, and a yaw rotation of the three-dimensional cuboid based on the top-down annotation; and
    determining a height of the three-dimensional cuboid based on the two-dimensional image annotation, and the position, the length, the width, and the yaw rotation of the three-dimensional cuboid.

9. The method of claim 8, wherein the three-dimensional sensor information includes a point cloud.

10. The method of claim 9, wherein generating the top-down representation of the three-dimensional sensor information is performed by plotting lateral locations of points from the point cloud in a two-dimensional coordinate space.

11. The method of claim 8, wherein the two-dimensional image annotation is obtained using an automated two-dimensional image annotation process.

12. The method of claim 8, wherein the top-down annotation is obtained using an automated top-down annotation process.

13. The method of claim 8, wherein the height of the three-dimensional cuboid is determined based on a geometric projection of the position, the length, the width, and the yaw rotation of the three-dimensional cuboid relative to the two-dimensional image.

14. The method of claim 8, wherein the position of the three-dimensional cuboid includes a lateral location of the object, and the bottom surface of the three-dimensional cuboid is determined further based on the lateral location of the object.

15. A system, comprising:
    a memory; and
    a processor configured to execute instructions stored in the memory to:
    obtain a two-dimensional image;
    obtain a two-dimensional image annotation that indicates presence of an object in the two-dimensional image;
    obtain three-dimensional sensor information;
    generate a top-down representation of the three-dimensional sensor information;
    obtain a top-down annotation that indicates presence of the object in the top-down representation;
    determine a bottom surface of a three-dimensional cuboid based on map information;

determine a position, a length, a width, and a yaw rotation of the three-dimensional cuboid based on the top-down annotation; and determine a height of the three-dimensional cuboid based on the two-dimensional image annotation, and the position, the length, the width, and the yaw rotation of the three-dimensional cuboid.

16. The system of claim 15, wherein the three-dimensional sensor information includes a point cloud.

17. The system of claim 16, wherein generating the top-down representation of the three-dimensional sensor information is performed by plotting lateral locations of points from the point cloud in a two-dimensional coordinate space.

18. The system of claim 15, wherein the two-dimensional image annotation is obtained using an automated two-dimensional image annotation process.

19. The system of claim 15, wherein the top-down annotation is obtained using an automated top-down annotation process.

20. The system of claim 15, wherein the height of the three-dimensional cuboid is determined based on a geometric projection of the position, the length, the width, and the yaw rotation of the three-dimensional cuboid relative to the two-dimensional image.

21. The system of claim 15, wherein the position of the three-dimensional cuboid includes a lateral location of the object, and the bottom surface of the three-dimensional cuboid is determined further based on the lateral location of the object.

* * * * *